(12) United States Patent
Sharma

(10) Patent No.: US 8,303,688 B2
(45) Date of Patent: Nov. 6, 2012

(54) FILTER APPARATUS AND METHOD

(75) Inventor: Sunil Dutt Sharma, Beecroft (AU)

(73) Assignee: Commonwealth Scientific and Industrial Research Organization, Campbell, Australian Capital Territory (AU)

(*) Notice: Subject to any disclaimer, the term of this patent is extended or adjusted under 35 U.S.C. 154(b) by 463 days.

(21) Appl. No.: 12/530,536

(22) PCT Filed: Mar. 7, 2008

(86) PCT No.: PCT/AU2008/000303
§ 371 (c)(1),
(2), (4) Date: Nov. 2, 2009

(87) PCT Pub. No.: WO2008/109928
PCT Pub. Date: Sep. 18, 2008

(65) Prior Publication Data
US 2010/0126350 A1    May 27, 2010

(30) Foreign Application Priority Data
Mar. 9, 2007 (AU) ................. 2007901239

(51) Int. Cl.
*B01D 45/00* (2006.01)
(52) U.S. Cl. ................ 95/268; 95/273; 95/279; 55/315; 55/320; 55/321; 55/322; 55/323; 55/324; 55/337; 55/327; 55/459.4; 55/301; 55/302; 210/355; 210/162; 210/321.69; 210/167.04; 210/262; 210/298

(58) Field of Classification Search ............. 55/315, 55/320–324, 337, 327, 459.4, 393, 301–302; 95/268, 273, 279; 210/355, 162, 321.69, 210/167.04, 262, 29
See application file for complete search history.

(56) References Cited

U.S. PATENT DOCUMENTS

| | | | | |
|---|---|---|---|---|
| 3,455,457 | A | * | 7/1969 | Popelar ............... 210/167.04 |
| 3,471,024 | A | * | 10/1969 | Doucet ................. 210/225 |
| 3,606,736 | A | * | 9/1971 | Leliaert et al. ............. 55/302 |
| 3,875,063 | A | * | 4/1975 | Treplin et al. ............. 210/304 |
| 4,319,897 | A | * | 3/1982 | Labadie .................. 55/302 |
| 4,584,003 | A | | 4/1986 | Oda et al. |

(Continued)

FOREIGN PATENT DOCUMENTS

EP 0 042 015 A1 12/1981

(Continued)

OTHER PUBLICATIONS

Supplementary European Search Report for European Application No. 08714351, dated Jul. 15, 2010, 1 page.

(Continued)

*Primary Examiner* — Jason M Greene
*Assistant Examiner* — Dung H Bui
(74) *Attorney, Agent, or Firm* — Brinks Hofer Gilson & Lione

(57) ABSTRACT

Disclosed herein is a filter apparatus comprising a fluid inlet for a fluid to be filtered in the apparatus; a first fluid outlet for fluid that has been filtered; and one or more barrier filters arranged between the fluid inlet and the first fluid outlet for filtering material from the fluid. In use, the fluid to be filtered is directed from the fluid inlet so as to promote a continuous erosion of material built up on the barrier filter(s). Also disclosed is a method of filtering particles from a particle laden fluid.

12 Claims, 3 Drawing Sheets

U.S. PATENT DOCUMENTS

| | | | |
|---|---|---|---|
| 4,647,298 A * | 3/1987 | Ribnitz | 55/334 |
| 4,735,635 A | 4/1988 | Israelson et al. | |
| 4,786,293 A * | 11/1988 | Labadie | 95/20 |
| 5,104,429 A | 4/1992 | Miller | |
| 5,788,848 A | 8/1998 | Blanche et al. | |
| 5,845,782 A | 12/1998 | Depew | |
| 6,155,430 A | 12/2000 | Goodman | |
| 6,569,217 B1 | 5/2003 | DeMarco | |
| 6,863,868 B1 | 3/2005 | Alvin | |
| 7,141,167 B2 | 11/2006 | Hofmann | |
| 2005/0095178 A1 | 5/2005 | Heidenreich | |
| 2005/0274094 A1* | 12/2005 | DeMarco | 55/356 |
| 2008/0139675 A1 | 6/2008 | Norbeck et al. | |
| 2008/0257148 A1 | 10/2008 | Klemm | |

FOREIGN PATENT DOCUMENTS

| | | |
|---|---|---|
| EP | 0 600 440 A2 | 5/1994 |
| EP | 1 458 457 B1 | 10/2008 |
| GB | 1 110 753 A | 4/1968 |
| GB | 1 158 929 A | 7/1969 |
| GB | 1 422 736 A | 1/1976 |
| JP | 10-000318 A | 1/1998 |
| WO | WO 95/06510 | 3/1995 |
| WO | WO 97/27930 | 8/1997 |
| WO | WO 03/055577 A1 | 7/2003 |
| WO | WO 2008/069860 A1 | 6/2008 |

OTHER PUBLICATIONS

Examination Report for European Application No. 08714351.7, dated Mar. 25, 2011, 5 pages.

Written Opinion for PCT Application No. PCT/AU2008/000303, 4 pages, May 14, 2008.

S. D. Sharma, M. Dolan, M. Dell 'Amico, A. Ilyushechkin, N. Kinaev, K. McLennan, D. J. Harris and K. V. Thambimuthu, "A Critical Review of Syngas Cleaning Technologies—Fundamental Limitations and Practical Problems", GCHT6, Osaka (Japan), Oct. 22-24, 2006 (9 pages).

Robert Mai, Helmut Seifert, Walter Haag, Hans Leibold and Steffen Heidenreich, "Operation Behavior of a Multi-Candle Filter with Coupled Pressure Pulse Recleaning during Normal Operation and in the Case of a Filter Candle Failure", Proceedings of the 5th International Symposium on Gas Cleaning at High Temperature, Sep. 17-20, 2002 (11 pages).

International Preliminary Report on Patentability for PCT Application No. PCT/AU2008/000303, 7 pages, May 28, 2009.

International Search Report for PCT Application No. PCT/AU2008/000303, 3 pages, Jun. 2, 2008.

* cited by examiner

FILTER APPARATUS AND METHOD

This application is a filing under 35 U.S.C. §371 of International Patent Application PCT/AU2008/000303, filed Mar. 7, 2008, which claims priority to Australian Application No. 2007901239, filed Mar. 9, 2007.

TECHNICAL FIELD

Disclosed is a filter apparatus and method for continuously filtering particles from a particle laden fluid.

BACKGROUND ART

Numerous applications produce fluids which require cleaning before they can be processed further. For example, raw syngas from coal gasifiers contains a number of solid contaminants which need to be removed to protect downstream process equipment against corrosion, or to protect downstream catalytic processes (such as shift reactions and hydrogen separation) against poisoning.

Existing gas cleaning processes typically involve barrier filters (such as candle filters) for removing solid contaminants from the gas. However, such processes suffer from a number of problems. For example, an ash deposit can build up when using conventional candle filter apparatus when filtering a waste gas (e.g. raw syngas). In order to clean the candle filters, a reverse pressure pulse is periodically provided to the filters, which causes the accumulated ash to fall off. In some situations, it may also be necessary to vibrate the filter to adequately clean it. Such cleaning operations typically require the filtration process to be stopped, and can then cause the candle filters to break. The reverse pressure pulse can also weaken or even break the candle filters, leading to a shortening of their working life.

Furthermore, a significant proportion of the filtration effect of a barrier filter occurs by virtue of the material deposited as a cake on the filter. In known systems, the periodic reverse pulse cleaning dislodges the cake and can thus allow some particles to pass through the filters immediately after cleaning.

SUMMARY OF THE DISCLOSURE

In a first aspect, there is provided a filter apparatus comprising a fluid inlet for a fluid to be filtered in the apparatus; a first fluid outlet for fluid that has been filtered; and one or more barrier filters arranged between the fluid inlet and the first fluid outlet for filtering material from the fluid. In use, the fluid to be filtered is directed from the fluid inlet so as to promote a continuous erosion of material built up on the barrier filter(s).

By directing the fluid to be filtered so as to promote a continuous erosion of material built up on the barrier filter(s), the filter(s) do not necessarily require frequent reverse pulse cleaning, and may therefore provide continuous steady state filtration for an extended period. The barrier filters can also be expected to have a much longer life than filters subjected to routine reverse pulse cleaning.

Furthermore, the filter apparatus may not require the cumbersome and more expensive controls required for reverse pulse cleaning, allowing the apparatus to have a simpler design and smaller size than existing filter apparatus.

Additionally, the filter apparatus is less likely to periodically allow fine particles to pass through the filter because a thin layer of residual built-up material can be maintained on each filter's surface to provide an enhanced continuous filtering.

Typically, the fluid to be filtered is caused to be directed laterally onto the one or more barrier filters.

The fluid inlet may, for example, be positioned at a side wall of the apparatus that surrounds the barrier filter(s).

In some embodiments, the filter apparatus may further comprise a compressor for forcing the fluid through the fluid inlet such that the fluid turbulently flows around the barrier filter(s). This turbulent flow may also enhance the continual erosion of material.

In some embodiments, the filter apparatus may further comprise a recycle loop that connects a second fluid outlet for fluid that has not been filtered to the fluid inlet to recycle unfiltered fluid to the fluid inlet. In such embodiments, when the fluid is a gas, the recycle loop may comprise a separator for removing at least some of the particulate material entrained in the gas before the gas is recycled into the fluid inlet. The separator may, for example, be a cyclone, shroud or venturi. The recycle of unfiltered fluid can enhance fluid flow in the apparatus, for example by enhancing turbulence, thereby promoting material erosion.

In some embodiments, the (or each) barrier filter has a tubular configuration, and the apparatus further comprises a distributor for causing the fluid entering the apparatus via the fluid inlet to flow in a tangential direction with respect to the (or each) barrier filter. For example, the filter apparatus may comprise a bank of elongate cylindrical barrier filters arranged in a housing of the apparatus, and the distributor may comprise a shell-type structure that interleaves with the barrier filter bank so as to promote a flow of the fluid to be filtered over a substantial portion of the barrier filters.

Typically, the fluid is used waste gas, fuel gas, flue gas, or raw or dirty syngas. Typically, the barrier filter is a candle filter.

In a second aspect, there is provided a method of filtering particles from a particle laden fluid with a barrier filter. The method comprises the step of directing the particle laden fluid onto the barrier filter such that a build up of material on the barrier filter is continuously eroded.

In some embodiments, the fluid is directed so as to turbulently flow over the surface of the barrier filter.

In some embodiments, the barrier filter is tubular and the fluid is directed so as to tangentially flow with respect to the surface of the barrier filter.

In some embodiments of the method, one or more such barrier filters may be housed in a filter apparatus, and the method further comprises the step of recycling unfiltered fluid recovered from the apparatus into the particle laden fluid being introduced into the apparatus. In embodiments in which the fluid is a gas, at least some of the particulate material entrained in the unfiltered gas recovered from the apparatus can be removed (e.g. by passing the gas through a cyclone, shroud or venturi) before the gas is recycled into the particle laden fluid.

The method of the second aspect can employ the apparatus of the first aspect. Typically, the barrier filter used in the method is a candle filter.

BRIEF DESCRIPTION OF THE DRAWINGS

Notwithstanding any other embodiments within the scope of the apparatus and method as set forth in the summary, specific apparatus and methods will now be described, by way of example only, with reference to the following drawings, in which.

DETAILED DESCRIPTION OF SPECIFIC EMBODIMENTS

Figure 1:
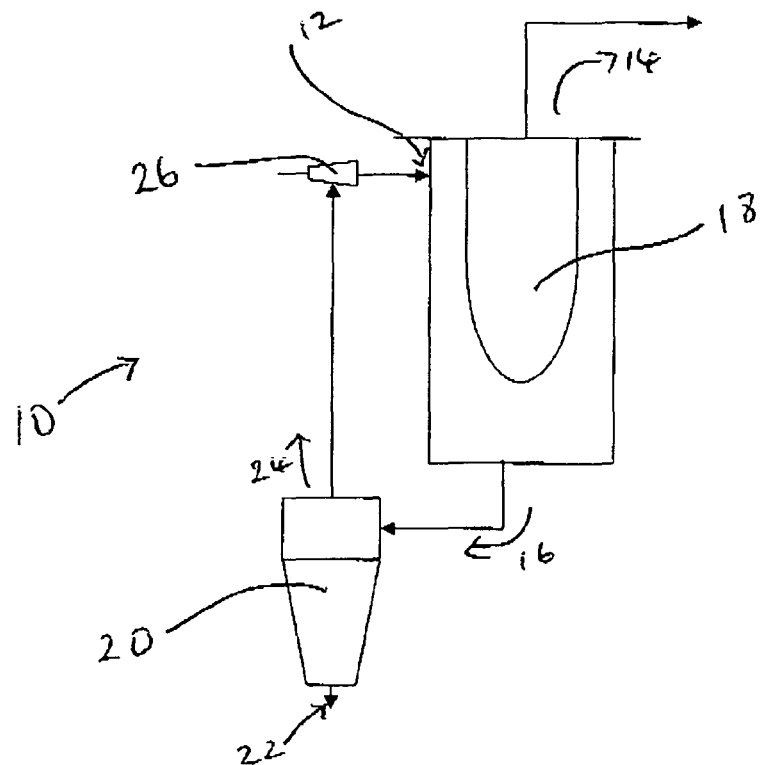
FIG. 1 shows a schematic drawing of a candle filter apparatus in accordance with one embodiment.

In accordance with the apparatus and method disclosed herein, a particle laden fluid to be filtered is directed onto a barrier filter so as to continuously erode material as it builds up on the filter. In order to continuously erode the material, the flow of fluid over the filter surface can re-entrain particles (e.g. particles that have deposited on the filter surface due to the forces associated with the flow of filtered fluid through the filter; i.e. because of the drop in pressure over the filter).

Furthermore, the flow of fluid needs to be appropriately directed onto the filter, for example, so that shear forces caused by the flow of fluid can assist in causing the built up material to be dislodged. Such dislodgement (i.e. erosion) can be controlled so as to maintain some material on the filter, which then participates in the filtration process.

Depending on the configuration and shape of the barrier filter apparatus and type of barrier filter, a turbulent flow over the surface may be used to enhance the erosion of the built-up material. For example, if the barrier filter is tubular (e.g. a candle filter), a flow directed so as to tangentially flow with respect to the surface of the filter can help to dislodge and re-entrain particles deposited on the filter. Turbulent, tangential flow may be preferred, for example, in situations where material is quickly built up on the filter.

The apparatus and method may be used for numerous applications where particles need to be separated from a fluid stream, for example, particulate removal in various processes used in existing coal fired power stations, in mining and mineral processing, and in sewage and waste water treatment. The fluid can, for example, be producer gas from gasification, combustion, incineration or pyrolysis, waste gas, fuel gas, flue gas, or raw or dirty syngas.

The apparatus and method may find application in the following industries: coal and biomass fired power generation, combustion and gasification based coal and biomass fired power generation, mineral processing, cement, petroleum and petrochemical, metallurgical, polymer, pharmaceutical, food, waste disposal, paper, and textile. The filter apparatus may also be used for catalyst recovery and as a substitute for existing particulate filters in various processes.

A specific application that is envisaged is in advanced coal gasification based power and hydrogen production systems, which have been recognised as the preferred routes towards a zero emissions target. These systems are power plants based on Integrated Gasification Combine Cycle (IGCC) and Integrated Gasification Fuel Cell (IGFC) and Clean Hydrogen Generator based on coal gasification, shift reactor and hydrogen separators.

The embodiments described below relate to filtering a gas through a filter apparatus employing one or more candle filter(s), however, it will be appreciated that the principles can be applied to any other kind of barrier filter apparatus which is being used to filter a liquid or gas.

Candle filters are most often used for filtering entrained particles from gases at a high temperature and pressure. In order to withstand the high operating temperature and corrosive environment, candle filters are typically made of monolithic silicon carbide, composite oxide fibres, iron-aluminide, iron-chromide, iron-chromide-aluminide or other alloy sintered and felted metals, as well as various ceramic fibres or powders.

Referring now to FIG. 1, a filter apparatus in the form of candle filter apparatus 10 is shown. Candle filter apparatus 10 has a fluid inlet for a gas to be filtered (e.g. used waste gas, fuel gas, flue gas, or raw or dirty syngas) in the form of inlet 12, a first fluid outlet for gas that has been filtered in the form of clean gas outlet 14, a second fluid outlet for gas that has not been filtered in the form of unfiltered gas outlet 16, and a candle filter 18 arranged between the inlet 12 and clean gas outlet 14. The inlet 12 is positioned at a side wall of apparatus 10 adjacent to the candle filter 18.

Unfiltered gas outlet 16 leads to a separator in the form of cyclone 20. Cyclone 20 has a particulates outlet 22 and a recycle gas outlet 24. Recycle outlet 24 is connected to a compressor in the form of jet ejector 26, which is arranged to provide an increased flow of gas into the inlet 12. Jet ejector 26 receives both the gas to be filtered and the recycled gas (which has passed through cyclone 20 and therefore is a relatively particle depleted gas) and forcefully ejects the mixture of gases into the apparatus 10 via the inlet 12.

In use, the gas to be filtered flows into the jet ejector 26 which ejects the particle rich gas into the apparatus 10 such that it turbulently flows laterally onto and over filter 18. During filtration, particulate material builds up on the surface of the filter 18 because of the pressure difference between the filtered (lower pressure) and unfiltered (higher pressure) sides of filter 18. However, as the gas is directed so as to flow over filter 18, the material that has built up on the filter (commonly referred to as "ash" or the "cake") is continuously eroded from the filter surface and becomes re-entrained in the turbulent gas flow. As such, the build up of too much material on filter 18, which would impede the filter's operation, is prevented and there may be no need to clean the filter by reverse pulse and/or vibration.

Usually, the rate of erosion is controlled to be not so high that all of the material built up on the surface of filter 18 (which itself provides a degree of filtration and protects the filter 18 and downstream processes from erosion and corrosion from possible fluid impurities such as alkalis, alkaline earths, halogens, sulphur, mercury, zinc, cadmium and other volatile metals) is eroded.

The clean (i.e. particle free) gas which passes through the filter 18 is removed via clean gas outlet 14. The unfiltered gas is removed via unfiltered gas outlet 16 and passes into cyclone 20. The cyclonic airflow present in cyclone 20 causes a significant proportion of the particulate material to fall out of the gas and exit the apparatus 10 via the particulates outlet 22. This helps to shift the need for particulates removal away from apparatus 10.

The relatively particle depleted (but unfiltered) gas then passes through recycle outlet 24 and into the jet ejector 26 where it is combined with more incoming (dirty) gas. Recycling the relatively particle depleted gas in this manner dilutes the gas (and thus reduces filtration load) and also provides an additional airflow to be turbulently directed onto the filter 18.

The quantity of gas and the velocity with which it is ejected into the apparatus 10 in order to ensure an appropriate rate of erosion (i.e. enough to prevent excessive build up of ash, but not so much that the entire coating of ash on the filter 18 is removed, which would expose the surface of the filter) will depend on the nature of the gas and particles being filtered. It is within the ability of one skilled in the art to determine appropriate operating conditions, using empirical means if necessary.

Figure 2:
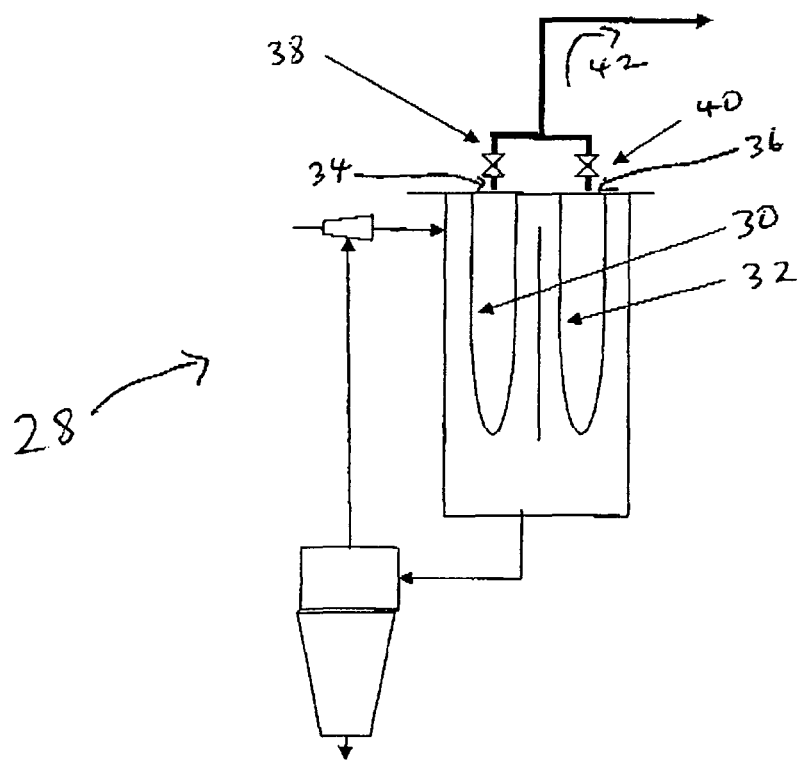
FIG. 2 shoes a schematic drawing of a candle filter apparatus in accordance with another embodiment.

Referring now to FIG. 2, a filter apparatus in the form of dual candle filter apparatus 28 is shown. Dual candle filter apparatus 28 is similar to candle filter apparatus 10 and similar components have not been numerically identified, however, it has two candle filters in the form of candle filter one 30 and candle filter two 32.

Dual candle filter apparatus 28 may be useful in situations where the fluid being filtered has a relatively high viscosity, or where the material has some degree of stickiness. In such situations, notwithstanding the continual erosion of material on the filters, the material can slowly but continuously build up on the filters. Apparatus 28 can also be used to maintain continuous operation during the service of one candle filter.

The dual candle filter apparatus 28 has filters 30 and 32 grouped into a bank. Filters 30 and 32 each have an outlet 34 and 36 respectively. Outlets 34 and 36 have valves 38 and 40, respectively, to stop or start the flow through the filters 30 and 32. Outlets 34 and 36 join after valves 38 and 40 to form combined outlet 42.

The operation of dual candle filter apparatus 28 is similar to that of candle filter apparatus 10, however, if too much material builds up on one of filters 30 or 32 (e.g. filter 30), filtration through the filter 30 can be stopped by closing valve 38. When valve 38 is closed, filter 30 will still hold the gas and maintain the pressure equal to the pressure within the body of apparatus 28. Gas still flows through combined outlet 42 because filter 32 continues to operate by filtering the gas being introduced through the inlet 12.

Whilst filtration of the incoming gas occurs through filter 32, the gas continues to turbulently flow over both filters 30 and 32. The flow of gas through filter 32 (which is filtering) is greater than through filter 30 (which is not filtering), and the flow of gas around filter 30 will tend to shear off much of the ash deposited on the surface of filter 30 because there is no pressure difference over the filter 30 to force the ash particles towards the surface of the filter.

In actual practice, valves at the outlets of the candle filters may not be required because in a bundle of hundreds of candle filters there will be an uneven distribution of flow across the bundle as the raw gas stream enters from the wall of the filter vessel. As a result, some of the filters will experience a relatively higher flow of gas around the filter which will cause faster erosion on those filters than that on others filters not experiencing such a high flow.

The filters with higher loading will have relatively lower filtration, but still be exposed to a turbulent flow of gas over their surface, because other filters with relatively less loading will continue to filter. This situation will result in material being eroded or dislodged more rapidly from more heavily loaded filters.

Figure 3:
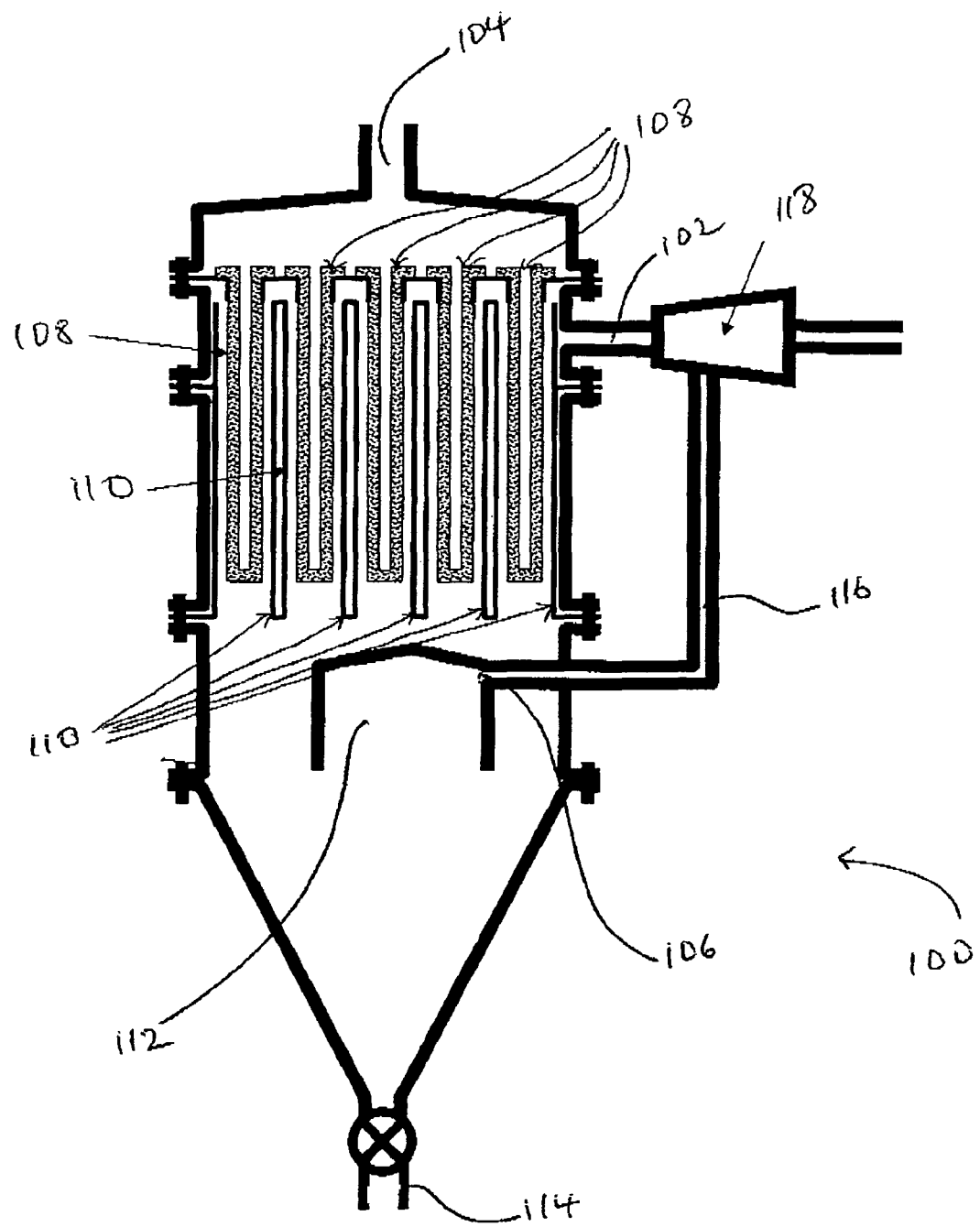
FIG. 3 shows a candle filter apparatus in accordance with a further embodiment.

A commercial scale filter apparatus 100 is shown in FIG. 3. Filter apparatus 100 has a fluid inlet for a gas to be filtered in the form of inlet 102, a first fluid outlet for gas that has been filtered in the form of clean gas outlet 104, a second fluid outlet for gas that has not been filtered in the form of unfiltered gas outlet 106, and plurality of candle filters 108 arranged between the inlet 102 and clean gas outlet 104. The inlet 102 is positioned at a side wall of apparatus 100.

The housing of filter apparatus 100 also has a plurality of distributors 110 for causing gas entering the apparatus 100 to flow in a tangential direction with respect to the candle filters 108. The distributors 110 provide a shell which interleaves with the candle filters 108 and enables a high tangential velocity to be maintained and distributed around a bulk of the filters in order to continuously erode the build up of material on the filters.

The lower portion of the filter apparatus 100 includes an internal cyclone (shroud) 112 for removing the agglomerates of fine particles which are formed as a result of densification of particulates in the outer shell of the candle filter. Providing an apparatus with an inbuilt cyclone (or alternatively a shroud, simple vessel, sedimentation chamber or venturi) can further reduce the size, cost and heat losses of candle filter apparatus. The cyclone could also have a variation in design (not shown) where the particle laden gas can enter from the bottom of the candle filters into the central tube of the cyclone and the cleaner gas could escape from the annulus around the central tube. The lowermost portion of the apparatus has a particulates outlet 114.

Cyclone 112 is joined to unfiltered gas outlet 106, which is connected by a recycle pipe 116 to a compressor in the form of jet ejector 118, which is arranged to provide a flow of gas into the inlet 102. Jet ejector 118 receives both the gas to be filtered and the recycled gas (which has passed through cyclone 112 and therefore is a relatively particle depleted gas) and ejects the gas combination with high velocity into the apparatus 100 via the inlet 102.

The interior space of the apparatus 100 can also be used to house a catalyst or membrane (not shown) for further processing of the cleaned syngas in order to save space and energy requirements with the downstream processes (e.g. shift converter, hydrogen separation).

In use, dirty gas (e.g. used waste gas, fuel gas, flue gas, or raw or dirty syngas) is ejected into the filter apparatus 100 by the jet ejector 118 via the inlet 102. The gas flows against the distributor 110, which forces the gas to flow at an appropriate velocity tangentially over the surface of each candle filter 108 in order to continuously erode the build up of ash on the filters. The gas filtered by candle filters 108 is removed from the apparatus 100 via the clean gas outlet 104, whilst the concentrated dirty gas moves downwards over the filter surface into a chamber portion containing the cyclone 112. The cyclone 112 coarsely removes a significant proportion of the entrained particles, which fall out of the apparatus 100 via particulates outlet 114 (e.g. a continuous rotating valve).

The diluted particle laden gas from the cyclone 112 then exits the cyclone via the unfiltered gas outlet 106, passes along recycle pipe 116 and is mixed with the inlet stream of dirty gas in the jet ejector 118 before being ejected back into the apparatus 100.

EXAMPLE 1

A laboratory scale pulseless candle filter system similar to that shown in FIG. 1 was developed and tested under simulated conditions at various temperatures and pressures using compressed air artificially entrained with fly ash.

Figure 4:
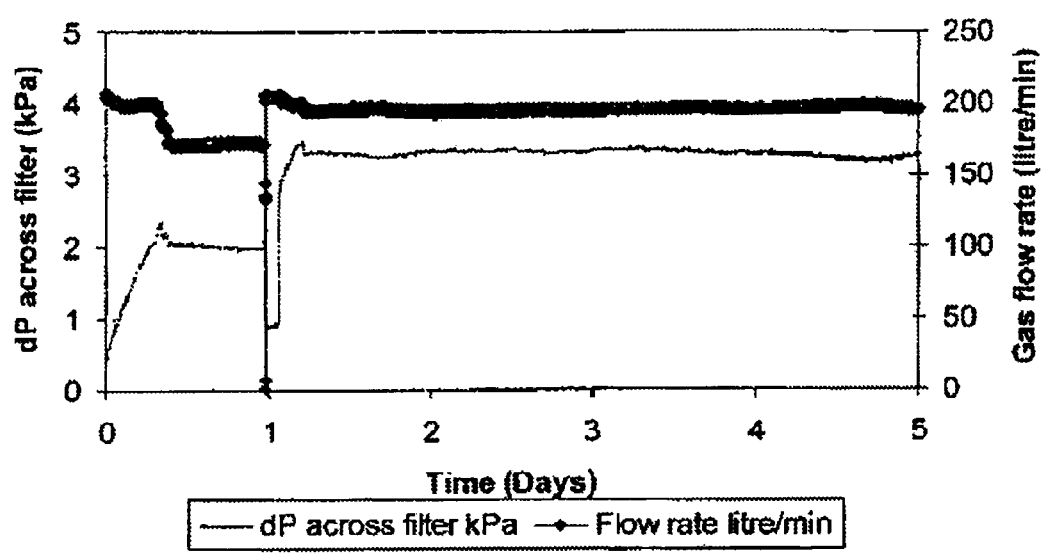
FIG. 4 shows the pressure drop across the candle filter and gas flow over a period of five days during laboratory testing.

The pulseless candle filter was tested in the laboratory at much higher face velocities (i.e. velocity over the surface of the candle filter) and temperatures than those recommended for commercial scale units. The results of a typical operation at 18° C. and 130 KPa pressure are shown in FIG. 4, which clearly indicates a constant pressure drop across the filter and a constant flow rate through the candle filter for five days (at the end of the first day, the experiment was briefly stopped to load ash in the ash feeder). These results indicated that the ash did not continually build up on the filter (i.e. the build up of ash was continuously eroded) and a constant rate of filtration was achievable for a prolonged period of time.

This experiment was conducted with an ash loading of about 500 ppmw. No pulse cleaning or vibrations or external forces of any kind was applied (or was necessary) to dislodge the cake from the filter surface.

It was also noted that at a temperature of 18° C. and pressure of 0.130 MPa, the air density was about 1.2 kg/m$^3$, which resembled the syngas density at 150° C./0.2 MPa, 375° C./0.3 MPa, 575° C./0.4 MPa, 800° C./0.5 MPa, 1850° C./1.0 MPa and 4350° C./2 MPa. For a given gas composition, temperature and pressure, the viscosity of the gas was related to density but increased with the temperature. Assuming that at higher temperatures, the higher viscosity of gas will have higher shear force on the deposited cake on the filter surface, a much thinner cake was likely to be formed. This indicated that the performance of the pulseless candle filter at 18° C. and 0.13 MPa would be similar or better than at the other conditions with syngas.

The filter tested in the laboratory had a recommended face velocity of between 2.5 to 25 mm/s, which corresponded to a flow rate of between 12.9 to 129 liters/min. However, in the pulseless continuous regime, the filter may be operated with a flow rate of about 200-245 liters/min, which indicated the size of the filtration unit could be reduced by a factor of up to three. This also implied that an up to 3 times reduction in material cost could be achieved, as well as a substantial overall reduction in capital costs, heat losses and therefore the operating costs.

No erosion of the candle filter due to running the system at a higher face velocity was observed because the candle filter was always coated with a 0.33 mm thick layer of residual cake, as estimated below.

| | |
|---|---|
| Average residual cake hold up weight = | 18 g |
| Approximate bulk density of cake = | 650 kg/m$^3$ |
| Surface area of candle filter = | 0.085 m$^2$ |
| Volume of residual cake = | 2.77 m$^3$ |
| Average residual cake thickness = | 0.33 mm |

The embodiments of the apparatus and method provided a number of advantages over the prior art, such as:
1. The apparatus can be operated continuously (weeks or months depending on the operating conditions) in a steady state, or for significantly longer periods than existing/conventional filter designs, at higher flow rates, which may allow for a substantial (up to 75%) reduction in size and capital cost of the filtration system, depending on the operating conditions and fuel type. A much higher availability factor and longer filter life is definitely possible even in the cases where there is little scope for size reduction.
2. No need for complex reverse pulse pipe work, valves, venturis and control system. Furthermore, in advanced reverse pulse systems, a heat exchanger or heating system is used to provide heated gas at the temperature of the operating candle filters to prevent filter breakage due to thermal shock or gradient. There is no need of such heaters or heat exchangers.
3. The elimination of reverse pulse cleaning opens up the possibility of incorporating shift converter and hydrogen separation processes within the candle filter, which can provide support to catalysts, membranes and other types of reactors installed inside each candle filter. This incorporation would further reduce the size, heat losses and costs and improve the overall efficiency of the IGCC based technologies:
4. The surface of a filter provides a support for the dust cake deposition, through which a significant proportion of filtration actually takes place. However, in conventional filtration systems, fine particles can pass through the filter just after the cake is completely dislodged by reverse pulse cleaning (i.e. before a layer of cake builds up again). During this time, the filter surface is subjected to maximum corrosion and erosion due to direct contact with the contaminants of the raw syngas. The present apparatus and method can prevent breakthrough of fine particles and provide a consistently higher filtration efficiency than conventional filter systems because they can be controlled so that the dust cake will never be completely dislodged.
5. Candle filters mostly break down during reverse pulse cleaning and this possibility can be completely eliminated. Moreover, any minor cracks that may develop on the filter as a result of mechanical vibration or thermal shock will not affect the filtration efficiency due to persistence of a dust cake on the surface of the filter, and the external force due to the pressure drop across the candle filter, which will hold the parts of the crack close together.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. A filter apparatus comprising:
a fluid inlet for a fluid to be filtered in the apparatus;
a first fluid outlet for fluid that has been filtered;
a bank of barrier filters having a tubular configuration and arranged between the fluid inlet and the first fluid outlet for filtering material from the fluid;
a distributor for causing the fluid entering the apparatus via the fluid inlet to flow over a surface of each barrier filter; and
a compressor for directing the fluid through the fluid inlet such that the fluid flows around the barrier filter(s);
wherein, in use, the fluid to be filtered is directed from the fluid inlet so as to promote a continuous erosion of material built up on the barrier filter(s) and wherein the distributor comprises a shell-type structure that interleaves with the barrier filter bank so as to promote a flow of the fluid to be filtered over a substantial portion of the barrier filters.

2. The filter apparatus of claim 1, comprising two or more barrier filters, each of which can be isolated to prevent the flow of fluid therethrough.

3. The filter apparatus of claim 1, wherein the fluid is waste gas, fuel gas, flue gas, or raw or dirty syngas.

4. The filter apparatus of claim 1, wherein the barrier filter is a candle filter.

5. The filter apparatus of claim 1, which further comprises a recycle loop that connects a second fluid outlet for fluid that has not been filtered to the fluid inlet to recycle unfiltered fluid to the fluid inlet.

6. The filter apparatus of claim 5, wherein the fluid is a gas and the recycle loop comprises a separator for removing at least some of the particulate material entrained in the gas before the gas is recycled into the fluid inlet.

7. The filter apparatus of claim 6, wherein the particulate material removed via the separator is removed from the apparatus via a particulates outlet.

8. The filter apparatus of claim 6, wherein the separator is a cyclone, shroud or venturi.

9. A method of filtering particles from a particle laden fluid with the filter apparatus of claim 1, the method comprising the step of:

directing the particle laden fluid onto the barrier filters such that a build up of material on the barrier filters is continuously eroded.

10. The method of claim 9, wherein the method further comprises the step of recycling unfiltered fluid recovered from the apparatus into the particle laden fluid being introduced into the apparatus.

11. The method of claim 10, wherein the fluid is a gas and at least some of the particles entrained in the unfiltered gas recovered from the apparatus are removed before the gas is recycled into the particle laden fluid.

12. The method of claim 11, wherein the particles are removed by passing the gas through a cyclone, shroud or venturi.

* * * * *